(12) United States Patent
Veronesi et al.

(10) Patent No.: US 9,213,334 B2
(45) Date of Patent: Dec. 15, 2015

(54) RUNWAY TRACTION ESTIMATION AND REPORTING SYSTEM

(71) Applicant: Goodrich Corporation, Charlotte, NC (US)

(72) Inventors: William A. Veronesi, Hartford, CT (US); Enrico Manes, Feeding Hills, MA (US); Michael Anthony Lynch, Shelburne, VT (US); Stephen E. Tongue, Hampden, MA (US); Richard Kolk, Troy, OH (US); Richard Paul Metzger, Troy, OH (US); Paul Martin Franz, Shelburne, VT (US); Robert Rudd, III, Vergennes, VT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/267,501

(22) Filed: May 1, 2014

(65) Prior Publication Data

US 2015/0316929 A1    Nov. 5, 2015

(51) Int. Cl.
| | |
|---|---|
| *B64D 45/00* | (2006.01) |
| *G05D 1/00* | (2006.01) |
| *G08G 5/02* | (2006.01) |
| *B64C 25/42* | (2006.01) |
| *G08G 5/06* | (2006.01) |

(52) U.S. Cl.
CPC ............ *G05D 1/0083* (2013.01); *B64C 25/426* (2013.01); *G08G 5/02* (2013.01); *G08G 5/06* (2013.01)

(58) Field of Classification Search
CPC ....... G05D 1/0083; G08G 5/02; G08G 5/025; G08G 5/06; G08G 5/065; B64C 25/42; B64C 25/426; B64C 25/46; B62C 25/46; B60T 8/1703; B60T 8/171; B60T 8/172; B60T 2210/12
USPC ............ 701/3, 16; 244/11, 183; 303/191, 583
See application file for complete search history.

(56) References Cited

U.S. PATENT DOCUMENTS

| | | | | |
|---|---|---|---|---|
| 4,482,961 A | * | 11/1984 | Kilner ................. | G05D 1/0083 244/183 |
| 2014/0012437 A1 | * | 1/2014 | Jones ................... | B60T 8/1703 701/15 |
| 2014/0107872 A1 | * | 4/2014 | Rado .................... | B60T 8/1703 701/16 |

* cited by examiner

*Primary Examiner* — Adam Tissot
(74) *Attorney, Agent, or Firm* — Snell & Wilmer, LLP.

(57) ABSTRACT

A runway traction estimation and reporting method and computer readable medium is provided. Upon detection of a landing event, a runway traction estimation and reporting method provides for various measurements and calculations to estimate the traction of the runway and create a traction map of the runway. A computer readable medium may contain instructions for a runway traction estimation and reporting processor directing the processor to perform various measurements and calculations to estimate the traction of the runway. The processor may communicate with a ground station or with other aircraft to produce collaborative results.

12 Claims, 4 Drawing Sheets

REPORTING ONLY MODE

RUNWAY TRACTION ESTIMATION AND REPORTING SYSTEM

FIELD

The present disclosure relates to braking systems and, more specifically, to a traction estimation and reporting system to improve situational awareness and/or braking performance for a vehicle operator.

BACKGROUND

It is advantageous for airplane pilots to know runway braking conditions before landing. Periodically, ground vehicles are driven down aircraft runways to assess runway braking conditions, then verbal reports are provided to pilots of airplanes on approach to landing. However, during the test, aircraft traffic must be halted. Moreover, runway conditions may fluctuate rapidly between tests, leading to deviations between test results and present conditions. Moreover, the quality of the data provided is often poor because braking reports are provided qualitatively, for example, by a verbal report transmitted to a pilot prior to landing. Thus, there is a need for timely and quantitatively more reliable runway condition data.

SUMMARY

Systems and methods disclosed herein may be useful in runway traction estimation and reporting systems. In this regard, a method for runway traction estimation and reporting is provided. In various embodiments, the method may include receiving, by a runway traction estimation and reporting processor, a first sensor input indicating a first triggering event. The method may include starting, by the runway traction estimation and reporting processor, and in response to receiving of the first sensor input, a polling timer, and receiving, by the runway traction estimation and reporting processor, a second sensor input in response to the polling timer indicating that a first period has elapsed. The method may include causing, by the runway traction estimation and reporting processor, the polling timer to run until a third sensor input indicating an ending event, and sending, by the runway traction estimation and reporting processor, a message to an output device in response to the second sensor input wherein the message includes a runway traction estimate.

In various embodiments, an article of manufacture including a non-transitory, tangible computer readable storage medium is provided. The article of manufacture may have instructions stored on it that, in response to execution by a runway traction estimation and reporting processor, cause the runway traction estimation and reporting processor to be capable of performing operations including receiving, by the runway traction estimation and reporting processor, a first sensor input indicating a first triggering event. Moreover, the operations may include starting, by the runway traction estimation and reporting processor, and in response to receiving of the first sensor input, a polling timer. The operations may also include receiving, by the runway traction estimation and reporting processor, a second sensor input in response to the polling timer indicating that a first period has elapsed, causing, by the runway traction estimation and reporting processor, the polling timer to run until a third sensor input indicating an ending event, and sending, by the runway traction estimation and reporting processor, a message to an output device in response to the second sensor input wherein the message includes a runway traction estimate.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, electrical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

Figure 1:
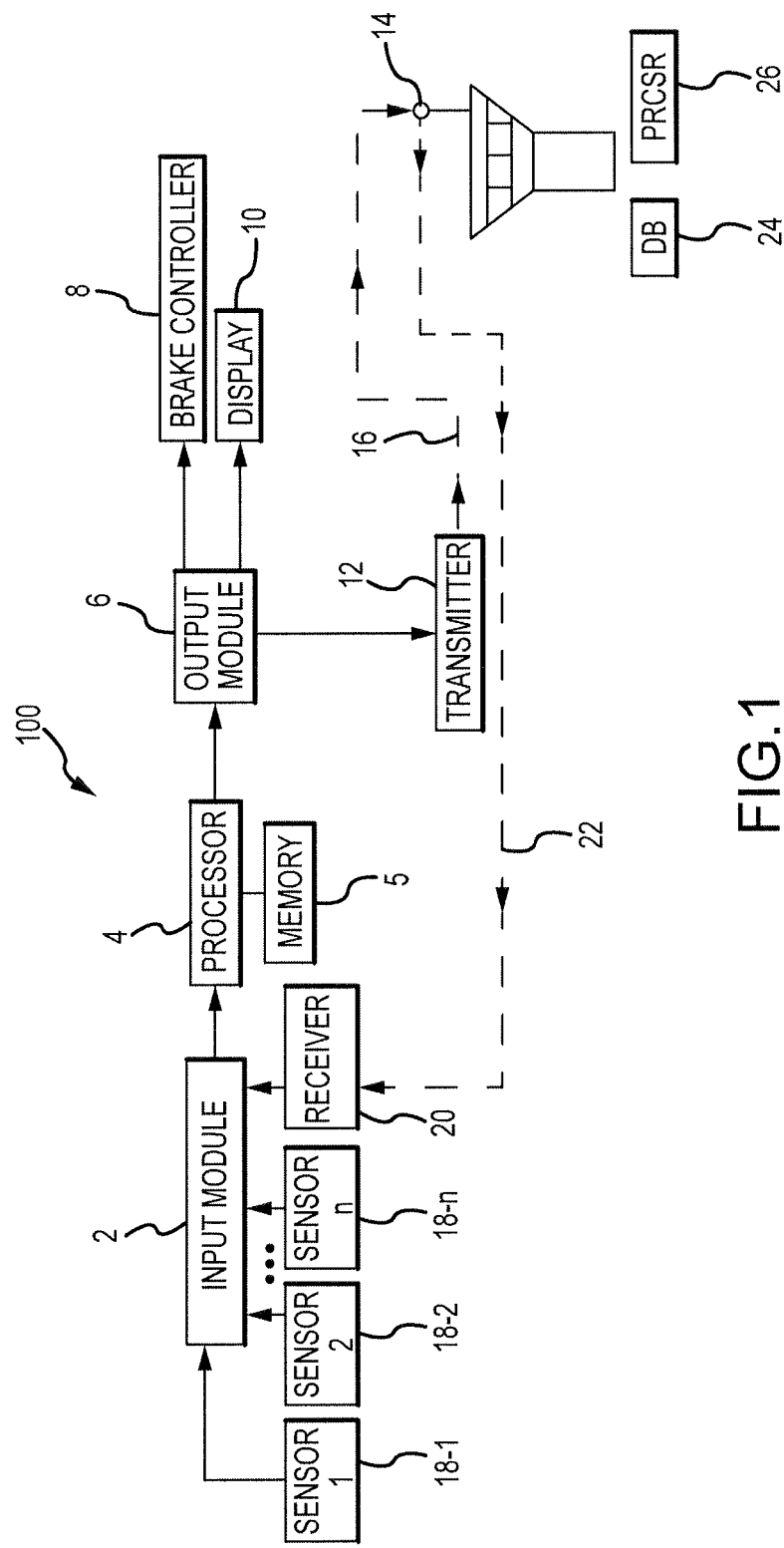
FIG. 1 illustrates a diagram of various components of a runway traction estimation and reporting system in accordance with various embodiments.

With reference to FIG. 1, an aircraft may comprise a runway traction estimation and reporting system 100. In various embodiments, a runway traction estimation and reporting system may comprise sensors 18, an input module 2, a processor 4 having a tangible, non-transitory memory 5, and an output module 6. In various embodiments, input module 2 is in electrical communication, optical communication, and/or radio frequency (RF) communication with sensors 18. In this manner, input module 2 may interact with sensors 18 to obtain data from the sensors 18. Input module 2 is also in electrical communication and/or radio frequency (RF) communication with the processor 4. In various embodiments, input module 2 provides data from the sensors 18 to the processor 4. In various embodiments, a runway traction estimation and reporting system 100 may have one or more sensors 18. For example, as illustrated in FIG. 1, an example runway traction estimation and reporting system 100 may have any number of sensors 18, for example, sensor 18-1, sensor 18-2, and sensor 18-n.

In various embodiments, processor 4 stores portions of this data in tangible, non-transitory memory 5, and performs processing operations on the data, subsequently providing output to an output module 6. In various embodiments, output module 6 is in electrical communication and/or radio frequency (RF) communication with processor 4 and with at least one output device.

In various embodiments, the output device comprises a brake controller 8, and/or a human-readable display 10, and/or a transmitter 12. In various embodiments, output module 6 may be in electrical communication and/or radio frequency (RF) communication with multiple output devices, for example, a brake controller 8, a human-readable display 10, and a transmitter 12.

In various embodiments, an output device may comprise a brake controller 8. A brake controller 8 may provide braking instructions to aircraft brakes and may comprise performance enhancing features such as antilock features, antiskid features, and hydraulic brake assist features, among others. In various embodiments, a brake controller 8 may control a single brake, may control multiple brakes, or may be paired redundantly with other brake controllers 8.

In various embodiments, an output device may comprise a human-readable display 10. For example, in various embodiments a human-readable display 10 may be an electronic flight bag (EFB) device. In various embodiments, a human-readable display 10 may be a cockpit display panel. For example, a human-readable display 10 may comprise a crew-alert system (CAS), or an engine-indication and crew-alert system (EICAS), or a multifunction display (MFD) or an electronic flight instrument system (EFIS) or any other output device panel. Moreover, in various embodiments, the output device may comprise a portable device (alone, or in addition to a cockpit panel), such as a receiver or transceiver that could be carried by flight crew personnel, for example, an EFB, or a tablet computer such as an iPad®, or MotionComputing® tablet. In various embodiments, the portable device may comprise a Class 1 EFB, or a Class 2 EFB, or a Class 3 EFB as defined in FAA Advisory Circular 120-76A, or may comprise any human readable device.

In various embodiments, an output device may comprise a transmitter 12. In various embodiments, transmitter 12 is a radio frequency transmitter, or an optical transmitter, a near-field magnetic communication transmitter, or any transmitter whereby the output data may be transmitted to a ground station 14 via a signal 16. In various embodiments, signal 16 comprises a radio frequency signal, a light signal, or any other electromagnetic signal. For example, transmitter 12 may be a WiFi transmitter, or a cellular transmitter, or an ACARS transmitter, or any other type of transmitter, for example, a transmitter adapted to interoperate with NextGen Air Traffic Control technology, or CASCADE air traffic control technology, or any other type of transmitter, for example a TIS-B or ADS-B transmitter.

In various embodiments, a sensor 18 may comprise a runway location identification sensor. For example, a sensor 18 may comprise a global positioning system ("GPS") unit programmed to provide input module 2 with the location of the aircraft along the runway. In this manner, data collected from various other sensors 18 by input module 2 may be provided to processor 4 and correlated with location data corresponding to the location of the airplane at the time the data collected from various other sensors 18 was collected.

In various embodiments, a sensor 18 may comprise an aircraft ground speed velocity identification sensor. For example, a sensor 18 may comprise a GPS unit programmed to provide input module 2 with the velocity of the aircraft. In various embodiments, this velocity is the instantaneous velocity of the aircraft. In various embodiments, this velocity is an interval-averaged velocity of the aircraft. Moreover, a sensor 18 may comprise an accelerometer, or gyroscopic sensor, radar sensor or any other sensor configured to provide an aircraft ground speed, whether individually or in combination with other sensors. In various embodiments, an additional sensor 18 may be provided comprising an airspeed sensor. For example, a processor 4 may implement an algorithm wherein knowing both the ground speed and the airspeed is advantageous, for example, in determining the effect of relative winds on runway traction estimation.

In various embodiments, a sensor 18 may comprise a wheel rotation angle sensor. For example, a sensor 18 may comprise a wheel slip sensor, or a wheel position encoder, or a comparative wheel velocity sensor, or a wheel speed sensor, or any other sensor which alone, or in combination with data from other sensors 18, provides data comprising a wheel rotation angle for at least one wheel.

In various embodiments, a sensor 18 may comprise a thrust reverser position sensor. For example, a sensor 18 may comprise an electrical or logical switch whereby the input module 2 receives data regarding the position of a thrust reverser for an engine. In various embodiments, a separate sensor 18 may detect the thrust reverser position for each engine, for example, if the thrust reversers may be activated independently, or to facilitate detection of a failure of one or more thrust reversers to operate correctly. In various embodiments, only a single sensor 18 is implemented to detect a thrust reverser position, for example, when thrust reversers are grouped together so that they all maintain the same position. In various embodiments, thrust reverser data is advantageous to determining the magnitude and direction of forces involved in the traction estimation.

In various embodiments, a sensor 18 may comprise a throttle position sensor. For example, a sensor 18 may comprise an electrical or logical sensor interfaced with the throttle linkage, or with other aircraft electronic systems, whereby the throttle position of each engine may be detected. In various embodiments, throttle position data is advantageous to determining the magnitude and direction of forces involved in the traction estimation.

In various embodiments, a sensor 18 may comprise a brake pressure sensor. For example, a sensor 18 may detect whether or not brakes are applied, the degree to which brakes are applied, and the slippage of the brakes. In various embodiments, a separate sensor 18 may be associated with each brake and/or aircraft wheel. In various embodiments, multiple sensors 18 are associated with each brake and/or aircraft wheel, for example, for redundancy.

In various embodiments, a sensor 18 may comprise a peak wheel acceleration sensor. For example, a sensor may determine the peak rotational acceleration of a wheel over a given time period, for example, as will be discussed further herein, over multiple polling intervals, or over one polling interval, or over a portion of a polling interval. In various embodiments, data from various sensors 18 is combined to provide peak wheel acceleration data, so that a peak wheel acceleration sensor comprises a logical sensor, rather than a physical electromechanical device. For example, aircraft velocity data and/or wheel rotation angle data and/or wheel speed data may be utilized to ascertain a peak wheel acceleration.

In various embodiments, a sensor 18 may comprise a wheel speed sensor. For example, in various embodiments a wheel speed sensor may comprise an optical encoder, a magnetic encoder, a dynamo sensor, or any other mechanism by which the speed at which a wheel rotates may be sensed.

In various embodiments, a sensor 18 may comprise a database. For example, a sensor 18 may comprise a stored data repository wherein various vector or scalar values useful for computations may be stored. In this manner, sensor 18 is not actively sensing a changing variable, but rather senses a stored value. For example, sensor 18 may comprise an aircraft type sensor, or an aircraft weight sensor, or an aircraft use mode sensor (for example, whether the aircraft is in passenger or cargo service as it may be advantageous to alter braking to improve passenger comfort). In this regard, sensor 18 may not be a traditional sensor, but may be repository from which input module 2 draws data.

In various embodiments, a sensor 18 may comprise a weather sensor. For example, a sensor 18 may comprise an onboard active weather detection device, such as rain sensor, or a wind speed sensor, or a thermometer, or a radar or another device by which ambient conditions are assessed. In various embodiments a weather sensor comprises an offboard passive weather detection device, for example, a device to receive a weather data feed. In various embodiments, the weather sensor may receive satellite weather data, or RF transmitted weather data, or METAR encoded weather data, or manually entered weather data, or weather data from a ASOS system, or an AWOS system, or an AWSS system, or any other type of weather reporting system.

In various embodiments, input module 2 also receives data from receiver 20. In various embodiments, receiver 20 may be a radio-frequency (RF) or optical signal receiver. For example, in various embodiments, as discussed further herein, ground station 14 may provide data, for example, historical data from other aircraft which were transmitted, for example by signal 16 to ground station 14 at a prior time. Ground station 14 may transmit this data, or may transmit processed data via signal 22, to receiver 20. In this manner, runway traction estimation and reporting system 100 may receive a runway traction report and may estimate runway traction prior to touchdown based on previously acquired data transmitted via signal 22 from a ground station 14. In various embodiments, runway traction estimation and reporting system 100 utilizes this data to improve its processing algorithms adaptively, for example, to calibrate various sensors and/or algorithms, or utilizes this data to provide aircrew members with a runway friction estimate comprising a runway map comprising runway friction data and corresponding location data in accordance with the principles discussed herein.

In various embodiments, multiple identical sensors may be implemented, for example, for each wheel, or each braking component. In this manner, the quality and resolution of the collected data may be improved. For example, the size, nature, and uniformity of patches of the runway with different traction characteristics may be resolved with improved granularity.

In various embodiments, a runway traction estimation and reporting system 100 comprises a processor 4 in communication with a memory 5. As will be discussed further herein, processor 4 in communication with memory 5 may perform various calculations and estimations whereby data received from input module 2 is utilized to estimate runway traction and provide this estimate to output module 6.

In various embodiments, output module 6 forwards runway traction data to various components. For example, output module 6 may be in electrical, optical, or radio frequency (RF) communication with a brake controller 8. In various embodiments, the runway traction estimation is processed by processor 4 in order to provide instructions to brake controller 8 regarding adaptive braking in order to improve braking performance in various conditions. For example, brake controller 8 could decrease braking force when transiting low traction areas of the runway in order to prevent wheel skid, and could increase braking force when transiting high traction areas of the runway in order to shorten stopping distance. For another example, the brake controller 8 could alter control gains when approaching and/or transiting a low traction area of the runway to improve the speed of response to skids and decrease stopping distance. In this manner, brake performance and aircraft safety may be improved.

In various embodiments, output module 6 forwards runway traction data to a human-readable display 10. In this manner, an aircraft crewmember may be provided with enhanced situational awareness. For example, in various embodiments, the human-readable display may present a runway friction estimate comprising a runway map comprising runway friction data and corresponding location data.

In various embodiments, output module 6 forwards runway traction data to a transmitter 12. In various embodiments, transmitter 12 may be in radio frequency (RF) or optical communication with a ground station 14 via signal 16. In this manner, data related to the runway conditions may be provided to the ground station 14 to enhance air traffic controller situational awareness, and/or for forwarding to other aircraft, for example, by signal 22.

In various embodiments, ground station 14 comprises a database 24 and a processor 26. In various embodiments, ground station 14 receives data from aircraft, and processor 26 performs calculations based on this data to create processed performance estimates. Processor 26 may also perform calculations based on stored data from database 24. In various embodiments, ground station 14 transmits this data to other aircraft according to the principles discussed herein or transmits these processed performance estimates to other aircraft according to the principles discussed herein. In various embodiments, ground station 14 transmits processed performance estimates, and/or stored data from database 24 to other aircraft according to the principles discussed herein. In this manner, both ground personnel and aircrews may have improved situational awareness and in various embodiments, braking systems may automatically adapt to runway traction conditions reported by ground station 14.

Figure 3:
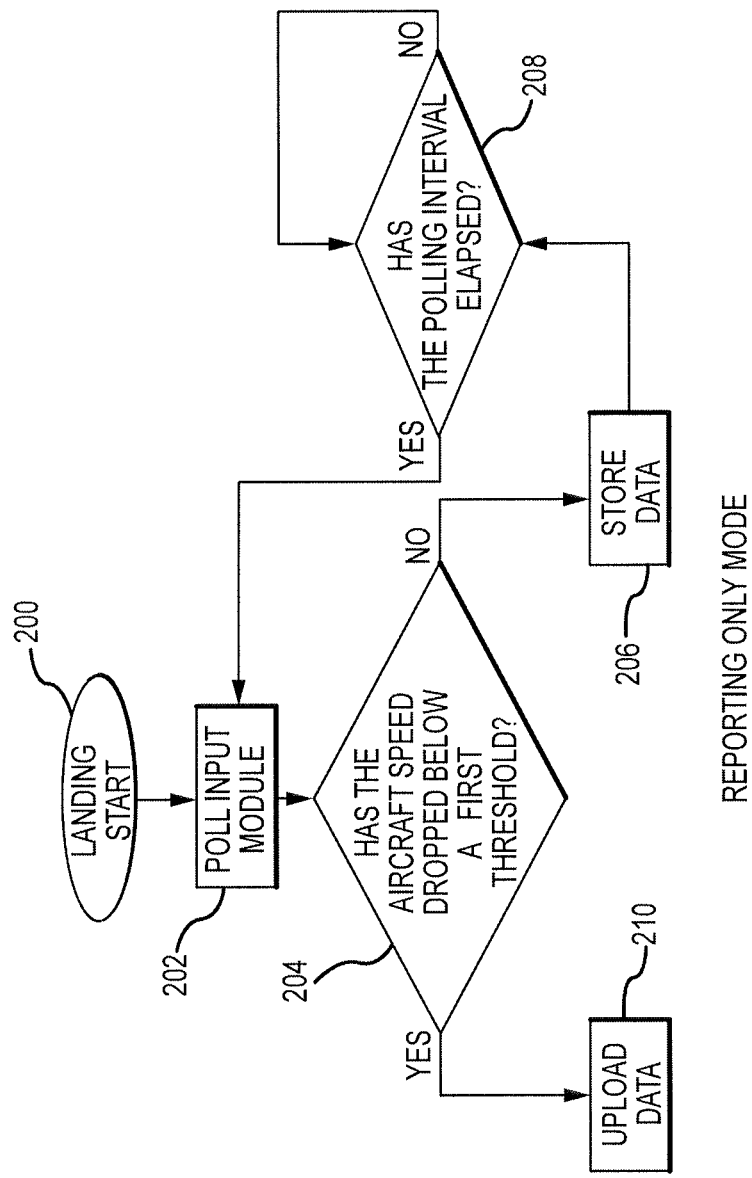
FIG. 3 illustrates a logical flowchart of various operations of a runway traction estimation and reporting routine performed by a runway traction estimation and reporting system configured to report runway conditions, in accordance with various embodiments.
Figure 4:
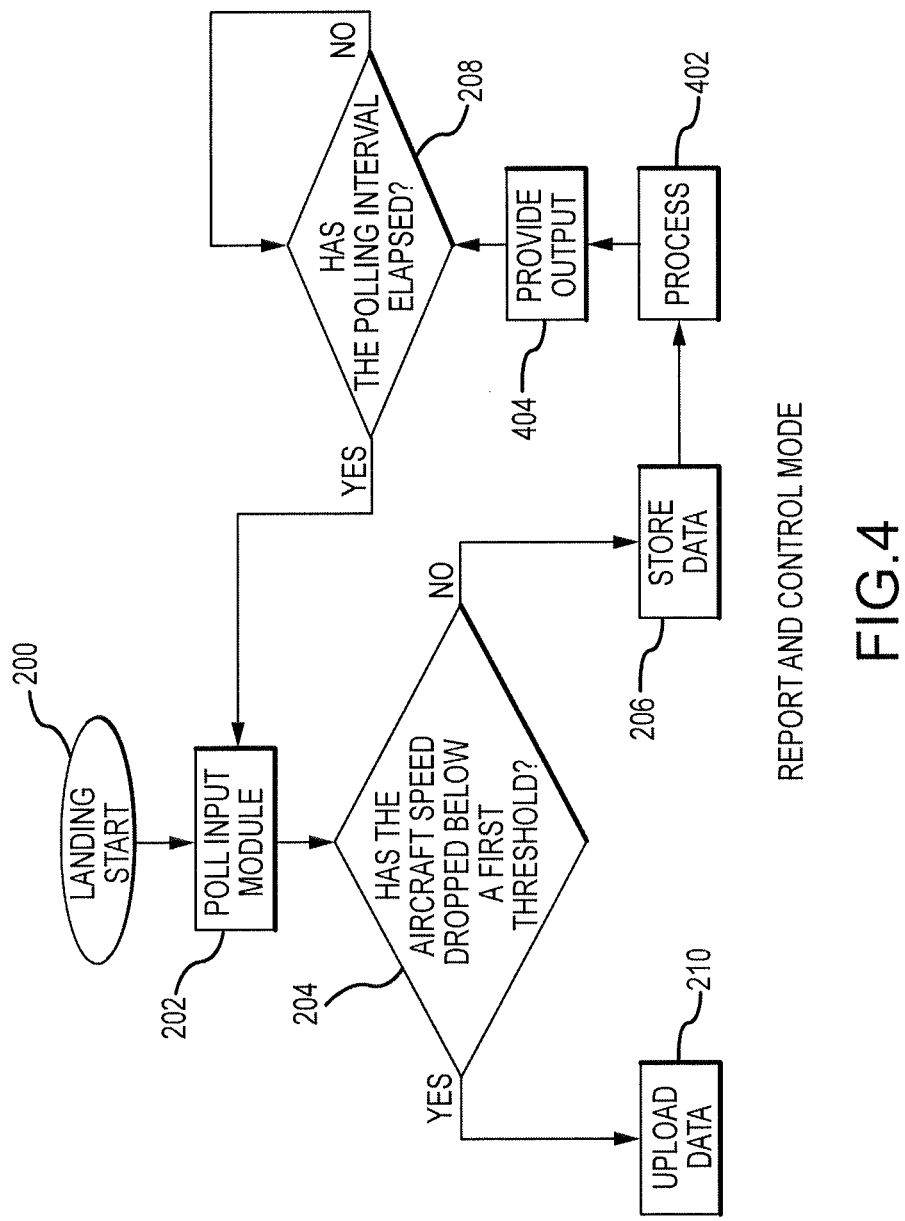
FIG. 4 illustrates a logical flowchart of various operations of a runway traction estimation and reporting routine performed by a runway traction estimation and reporting system configured to report runway conditions and to control an aircraft brake in response to runway conditions, in accordance with various embodiments.

Having discussed various functional elements of a runway traction estimation and reporting system, with reference to FIG. 3-4, various exemplary data collection algorithms or runway traction estimation and reporting routines are used in whereby the data to be processed in order to provide the runway traction estimate may be collected. In various embodiments, these algorithms or routines may be performed by runway traction estimation and reporting system in whole or part onboard the aircraft, for example by processor 4 in communication with tangible, non-transitory memory 5 (See FIG. 1). In various embodiments, these algorithms or routines may be performed in whole or part off board the aircraft, for example at ground station 14 comprising processor 26, where potentially greater computing power may be available.

Figure 2:
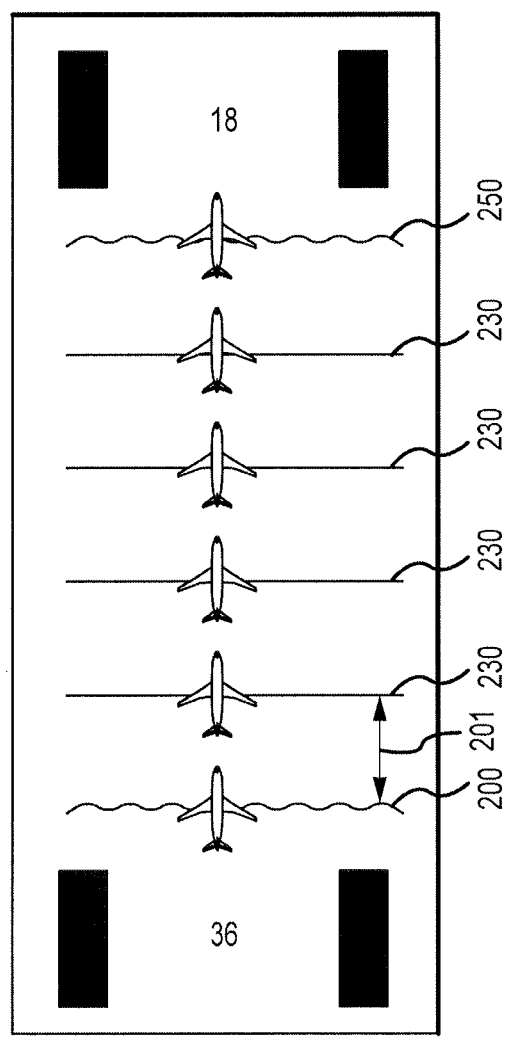
FIG. 2 illustrates various behavioral aspects of runway traction estimation and reporting systems, in accordance with various embodiments.

With reference to FIGS. 1, 2 and 3, in various embodiments, a runway traction estimation and reporting system may operate in a reporting only mode. For example, an algorithm or routine may begin at step 200 after processor 4 receives an indication such as by a first sensor input that a triggering event 200 has occurred. In various embodiments, the triggering event 200 is the initial touchdown of the aircraft upon landing. In various embodiments, processor 4 then starts a polling timer to poll the input module 2 (step 202) and obtains the status of various sensors, for example, a second sensor input. This polled sensor data is placed in memory 5. The processor assesses the aircraft speed to determine whether it has dropped below a first threshold (step 204). In various embodiments, the first threshold comprises a velocity at which the landing may be said to be complete, e.g., a landing threshold. In various embodiments, the first threshold comprises 10 knots. In various embodiments, the first threshold comprises the speed at which an aircraft may make a safe, no braking turn off a runway onto a taxiway.

In various embodiments, the polling timer continues to run and poll the sensors until the processor receives a sensor input indicating an ending event, for example, a third sensor input. In various embodiments, the algorithm or routine may terminate with an ending event 250. For example, if the aircraft speed is less than or equal to the first threshold, in various embodiments, the speed indicates that the landing has completed. Consequently, the algorithm or routine proceeds to step 210, wherein any stored data, e.g., in memory 5, is uploaded to a ground station 14, and/or forwarded to an output device, and/or processed according to various calculations and algorithms for processing the collected data discussed further herein.

If the aircraft speed indicates that the landing has not yet completed (the speed is greater than the first threshold), the algorithm proceeds to step 206, wherein the processor stores the input data in memory 5. In various embodiments, the processor 4 first processes the data according to various calculations and algorithms for processing the collected data discussed further herein before proceeding to step 206. In various embodiments, the processor 4 stores the data in memory 5, then processes the data according to various calculations and algorithms for processing the collected data discussed further herein after proceeding to step 206. In other embodiments, the processor does not process the data but stores it in memory 5, pending the completion of the landing. In various embodiments, the processor never processes the data according to various calculations and algorithms for processing the collected data but rather transmits the data to a ground station 14 at which the data is processed according to these algorithms.

Next, the collection algorithm proceeds to step 208, wherein the processor assesses whether a first polling interval has elapsed. If the interval has not elapsed, the workflow stops at step 208, until a first polling interval 201 has elapsed. If the first polling interval 201 (See FIG. 2) has elapsed, the processor returns to step 202 and polls the input module again.

In various embodiments, a first polling interval comprises a duration of time between instances 230 in which data from various sensors 18 is collected. For example, with particular reference to FIG. 2, in various example embodiments, a polling interval may be 1/10 of a sec (e.g., frequency of 10 Hz). In various other embodiments, a polling interval may be variable based on the aircraft velocity. In this manner, more frequent samples may be taken when the aircraft is traveling fast and less frequent samples may be taken when the aircraft is traveling slowly. For example, the Nyquist sampling theorem may be implemented in conjunction with a pulse-width modulated antilock braking system and/or antiskid braking system and a variable sampling rate thus utilized to ameliorate the risks of input and/or brake signal aliasing.

With particular reference to FIG. 4 and continuing reference to FIGS. 1 and 2, in various embodiments, a runway traction estimation and reporting system may operate in a control and reporting mode rather than merely a reporting mode.

For example, an algorithm or routine may begin at step 200 after processor 4 receives an indication such as by a first sensor input that a triggering event 200 has occurred. In various embodiments, the triggering event 200 is the initial touchdown of the aircraft upon landing. In various embodiments, processor 4 then starts a polling timer to poll the input module 2 (step 202) and obtains the status of various sensors, for example, a second sensor input. This polled sensor data is placed in tangible, non-transitory memory 5. The processor assesses the aircraft speed to determine whether it has dropped below a first threshold (step 204). In various embodiments, the first threshold comprises a velocity at which the landing may be said to be complete, e.g., a landing threshold. In various embodiments, the first threshold comprises 10 knots. In various embodiments, the first threshold comprises the speed at which an aircraft may make a safe, no braking turn off a runway onto a taxiway.

In various embodiments, the polling timer continues to run and poll the sensors until the processor receives a sensor input indicating an ending event, for example, a third sensor input. In various embodiments, the algorithm or routine may terminate with an ending event 250. For example, if the aircraft speed is less than or equal to the first threshold, in various embodiments, the speed indicates that the landing has completed. Consequently, the algorithm or routine proceeds to step 210, wherein any stored data, e.g., in memory 5, is uploaded to a ground station 14, and/or forwarded to an output device, and/or processed according to various calculations and algorithms for processing the collected data discussed further herein.

If the aircraft speed indicates that the landing has not yet completed (the speed is greater than the first threshold), the algorithm proceeds to step 206, wherein the processor stores the input data in memory 5. In various embodiments, the processor 4 then processes the data (step 402) according to various calculations and algorithms for processing the collected data discussed further herein. In various embodiments, the algorithm or routine proceeds to step 404 wherein the processor 4 produces an output based on the processing and sends the output to output module 6. This output is sent to an output device where it may be utilized according to the principles discussed herein. For example, the output instructions may be sent to a human-readable display 10 for improving flight crew situational awareness, or may be sent to a brake controller 8, for improving braking performance, or may be sent to a transmitter 12, for relay to a ground station 14 or other aircraft (for example, directly to a receiver 20 of another aircraft). In various embodiments, the output is not transmitted to an output device until the aircraft speed has dropped below the first threshold.

Next, the algorithm proceeds to step 208, wherein the processor assesses whether a first polling interval has elapsed. If the interval has not elapsed, the workflow stops at step 208, until a first polling interval 201 has elapsed. If the first polling interval 201 (See FIG. 2) has elapsed, the processor returns to step 202 and polls the input module again.

In various embodiments, a first polling interval comprises a duration of time between instances 230 in which data from various sensors 18 is collected. For example, with particular reference to FIG. 2, in various example embodiments, a polling interval may be 1/10 or 2/20 of a sec (e.g., frequency of 10 Hz) (+/−1/20 of a sec). Alternatively, a polling interval may be 1/400 or 2/800 of a sec (e.g., frequency of 400 Hz) (+/−1/800 of a sec). In various other embodiments, a polling interval may be variable based on the aircraft velocity. In this manner, more frequent samples may be taken when the aircraft is traveling fast and less frequent samples may be taken when the aircraft is traveling slowly. For example, the Nyquist sampling theorem may be implemented in conjunction with a pulse-width modulated antilock braking system and a variable sampling rate thus utilized to ameliorate the risks of input and/or brake signal aliasing.

In various embodiments, various features of various embodiments may be combined in different manners as appreciated by one having ordinary experience in the art. For example, a runway traction control and reporting system may operate in a control only mode wherein the data is not transmitted via a transmitter 12, but is retained for internal use only. For example, it may be advantageous for an aircraft to land in a radio-silent configuration, yet to have the benefit of improved runway traction estimation and in some embodiments, the benefit of runway traction reporting provided by other aircraft. For example, it may be advantageous to retain certain operational details of an aircraft or the existence of the aircraft at the airfield in confidence. In various embodiments, a runway traction estimation and reporting system may be switched between various operational modes, for example, reporting only, reporting and controlling, and/or controlling only (e.g., radio silent).

Having discussed various functional elements of a runway traction estimation and reporting system, and various data collection and/or reporting algorithms, with reference to FIG. 2, various calculations and algorithms for processing the collected data are disclosed. In various embodiments, these algorithms may be performed in whole or part onboard the aircraft, for example by processor 4 in communication with tangible, non-transitory memory 5 (See FIG. 1). In various embodiments, these algorithms may be performed in whole or part off board the aircraft, for example at ground station 14 comprising processor 26, where potentially greater computing power may be available.

For example, in various embodiments, a history of wheel speed information is collected during a landing to iteratively estimate the friction properties of a runway. For example, brake pressure and wheel speed measurements may be mapped to aircraft position data on the runway. In various embodiments, wheel accelerations may be calculated in order to estimate wheel slip. In various embodiments, the difference between a wheel's axle speed (e.g., aircraft speed) and a wheel's speed may comprise a wheel slip ratio whereby wheel slip may be determined. Moreover, in various embodiments, a brake controller may implement anti-skid functionality wherein peak wheel accelerations may be utilized to estimate wheel slip. In various embodiments, correlation between events on the left side wheels of the aircraft and the right side wheels of the aircraft may be evaluated to further refine the boundaries of various runway areas having different traction estimates. For instance, because individual braked wheels provide data accurate to different portions of the runway, correlation between events on different sides of the aircraft, or on different wheels on the same side of the aircraft may permit further refinement of the boundaries of various runway areas having different traction estimates.

In various embodiments runway location data and aircraft velocity date are obtained from at least one GPS unit. Moreover, wheel rotation angle may be mapped to aircraft location measurements. In this manner, mapping of the brake control algorithm derived friction estimates will provide actual, average wheel slip data, whereby the friction estimates may be further refined.

Similarly, position of the thrust reversers and/or throttle position data may be incorporated into the algorithm, as a slip event during a time of thrust reversal likely indicates a lesser friction coefficient (lower runway traction), than a slip event during a time of forward thrust. Furthermore, during an autobrake braking event (for example, constant deceleration without any wheel skid events) the presence of reverse thrust has the potential of producing a lower floor for detectable friction properties than would be produced without reverse thrust. In various embodiments, the reverse thrust effect is less significant for the assessment of runway traction properties during a skid event.

In various embodiments, while the runway traction estimation and reporting systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, in which adaptation to environmental conditions is desirable, for example, automobile braking systems.

A runway traction estimation and reporting system may include built-in testing logic. Built-in testing logic may comprise logic to perform certain tests (i.e., diagnostics) to determine whether the runway traction estimation and reporting systems is in a malfunctioning state. Built-in testing logic may reside in a sensor or a processor, such as processor 4, or a brake controller, such as brake controller 8, or any other component of a runway traction estimation and reporting system or other system in communication with the runway traction estimation and reporting system. Built-in testing logic may also include safety features that use aircraft status information to verify that the system is in condition for operation.

As used herein, the meaning of the term "non-transitory computer-readable medium" should be construed to exclude only those types of transitory computer-readable media which were found in *In re Nuijten,* 500 F.3d 1346 (Fed. Cir. 2007) to fall outside the scope of patentable subject matter under 35 U.S.C. §101, so long as and to the extent *In re Nuijten* remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for runway traction estimation and reporting comprising:
    receiving, by a runway traction estimation and reporting processor, a first sensor input indicating a first triggering event;
    starting, by the runway traction estimation and reporting processor and in response to the receiving of the first sensor input, a polling timer;
    receiving, by the runway traction estimation and reporting processor, a second sensor input in response to the polling timer indicating that a first period comprising one of $1/20$ to $3/20$ of a second and $1/800$ to $3/800$ of a second has elapsed, wherein the second sensor input is received in response to each indicated passage of the first period of the polling timer;
    causing, by the runway traction estimation and reporting processor, the polling timer to run until a third sensor input indicating an ending event is received; and
    processing, by the runway traction estimation and reporting processor, the second sensor input comprising a brake pressure and a wheel speed measurement; and
    calculating, in response to the processing, a runway friction estimate comprising a runway map comprising runway friction data comprising the second sensor input and corresponding location data corresponding to the location of the aircraft at each indicated passage of the first period of the polling timer,
    whereby wheel slip at each location datum is determined; and
    sending, by the runway traction estimation and reporting processor, a message to an output device in response to the determining the wheel slip at each location datum wherein the message comprises the runway traction estimate.

2. The method of claim 1, wherein the output device comprises a transmitter.

3. The method of claim 1, wherein the output device comprises a brake controller.

4. The method of claim 1, further comprising:
    receiving, by the runway traction estimation and reporting processor, a first traction report, from a receiver,
    wherein the sending is further in response to the first traction report.

5. The method of claim 1, wherein the first triggering event is an initial aircraft touchdown.

6. The method of claim 1, wherein the ending event is an indication that an aircraft ground speed is at least one of less than and equal to 10 knots.

7. The method of claim 1 wherein the second sensor input further comprises at least one of:
    a runway location identification;
    an aircraft ground speed velocity identification;
    a wheel rotation angle identification;
    a thrust reverser position identification;
    a throttle position identification;
    a peak wheel acceleration identification;
    weather data;
    a stored variable comprising aircraft type; and
    a stored variable comprising aircraft weight.

8. The method of claim 1, wherein the calculating the runway traction estimate further comprises retrieving stored data from a tangible, non-transitory memory.

9. An article of manufacture including a non-transitory, tangible computer readable storage medium having instructions stored thereon that, in response to execution by a runway traction estimation and reporting processor, cause the runway traction estimation and reporting processor to be capable of performing operations comprising:
    receiving, by the runway traction estimation and reporting processor, a second sensor input in response to the polling timer indicating that a first period comprising one of $1/20$ to $3/20$ of a second and $1/800$ to $3/800$ of a second has elapsed, wherein the second sensor input is received in response to each indicated passage of the first period of the polling timer;
    causing, by the runway traction estimation and reporting processor, the polling timer to run until a third sensor input indicating an ending event is received; and
    processing, by the runway traction estimation and reporting processor, the second sensor input comprising a brake pressure and a wheel speed measurement; and
    calculating, in response to the processing, a runway friction estimate comprising a runway map comprising runway friction data comprising the second sensor input and corresponding location data corresponding to the location of the aircraft at each indicated passage of the first period of the polling timer,
    whereby wheel slip at each location datum is determined; and
    sending, by the runway traction estimation and reporting processor, a message to an output device in response to the determining the wheel slip at each location datum wherein the message comprises the runway traction estimate.

10. The non-transitory, tangible computer readable storage medium of claim 9, further comprising:
    receiving, by the runway traction estimation and reporting processor, a first traction report, from a receiver,
    wherein the sending is further in response to the first traction report.

11. The non-transitory, tangible computer readable storage medium of claim 9 wherein the second sensor input comprises at least one of:
a runway location identification;
an aircraft ground speed velocity identification;
a wheel rotation angle identification;
a thrust reverser position identification;
a throttle position identification;
a peak wheel acceleration identification;
weather data;
a stored variable comprising aircraft type; and
a stored variable comprising aircraft weight.

12. The non-transitory, tangible computer readable storage medium of claim 9,
wherein the calculating the runway traction estimate further comprises retrieving stored historical data comprising a previously acquired runway friction estimate from a tangible, non-transitory memory, and
wherein the sending the message to the output device in response to the second sensor input is further in response to the previously acquired runway friction estimate.

\* \* \* \* \*